(12) United States Patent
Kurz et al.

(10) Patent No.: US 7,250,868 B2
(45) Date of Patent: Jul. 31, 2007

(54) MANUFACTURE OF RFID TAGS AND INTERMEDIATE PRODUCTS THEREFOR

(75) Inventors: Arthur A. Kurz, New Vernon, NJ (US); Wayne Dunn, Sussex, NJ (US)

(73) Assignee: A K Stamping Co. Inc., Mountainside, NJ (US)

(*) Notice: Subject to any disclaimer, the term of this patent is extended or adjusted under 35 U.S.C. 154(b) by 100 days.

(21) Appl. No.: 11/075,390

(22) Filed: Mar. 8, 2005

(65) Prior Publication Data

US 2005/0198811 A1 Sep. 15, 2005

Related U.S. Application Data

(60) Provisional application No. 60/552,644, filed on Mar. 12, 2004.

(51) Int. Cl.
*G08B 13/14* (2006.01)
(52) U.S. Cl. ............... 340/572.7; 340/572.8; 29/600; 29/601; 29/832
(58) Field of Classification Search ............ 340/572.7, 340/572.5, 572.8; 29/601, 832, 846, 600
See application file for complete search history.

(56) References Cited

U.S. PATENT DOCUMENTS

| | | | |
|---|---|---|---|
| 1,837,678 A | 12/1931 | Ryder | |
| 2,401,472 A | 6/1946 | Franklin | |
| 5,182,570 A * | 1/1993 | Nysen et al. | 343/795 |
| 5,194,876 A * | 3/1993 | Schnetzer et al. | 343/769 |
| 5,313,216 A | 5/1994 | Wang et al. | |
| 5,528,222 A * | 6/1996 | Moskowitz et al. | 340/572.7 |
| 5,574,470 A | 11/1996 | de Vall | |
| 5,598,032 A | 1/1997 | Fidalgo | |
| 5,621,422 A | 4/1997 | Wang | |
| 6,087,940 A * | 7/2000 | Caperna et al. | 340/572.5 |
| 6,140,146 A | 10/2000 | Brady et al. | |
| 6,161,761 A * | 12/2000 | Ghaem et al. | 235/492 |
| 6,333,721 B1 * | 12/2001 | Altwasser | 343/867 |
| 6,421,013 B1 | 7/2002 | Chung | |
| 2002/0036237 A1 * | 3/2002 | Atherton et al. | 235/492 |
| 2005/0134036 A1 * | 6/2005 | Trimble et al. | 283/75 |

FOREIGN PATENT DOCUMENTS

EP 0 665 705 8/1995

* cited by examiner

*Primary Examiner*—Jeffery Hofsass
*Assistant Examiner*—Edny Labbees
(74) *Attorney, Agent, or Firm*—Arthur Jacob

(57) ABSTRACT

An improvement in the manufacture of radio frequency identification tags employs an antenna stamped from a thin metallic sheet and affixed to a substrate at a first location to establish an intermediate product in which the stamped antenna is affixed to the substrate, and the intermediate product is placed at at least one subsequent location for further processing toward completion of a radio frequency identification tag.

28 Claims, 7 Drawing Sheets

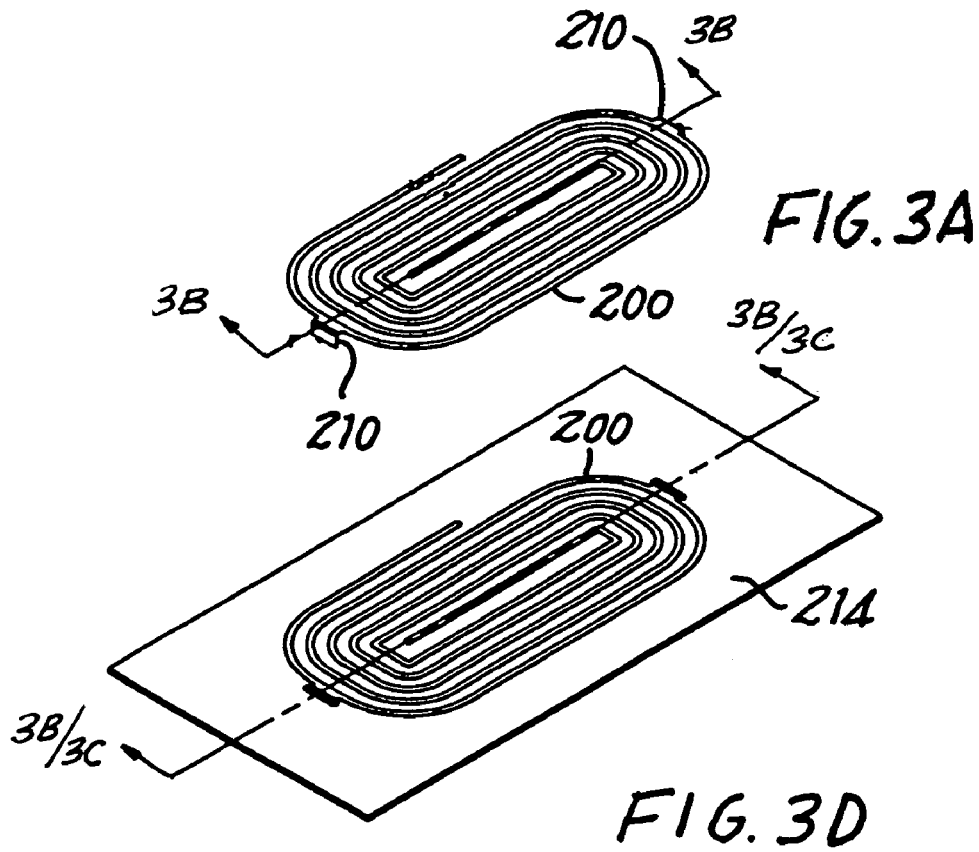
FIG. 3A
FIG. 3D
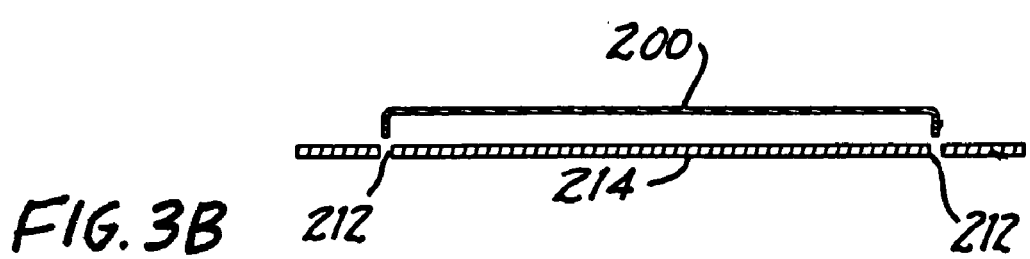
FIG. 3B
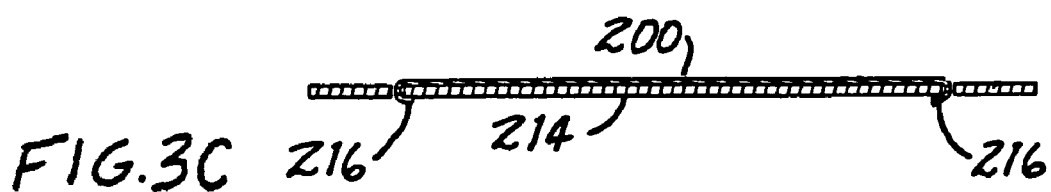
FIG. 3C

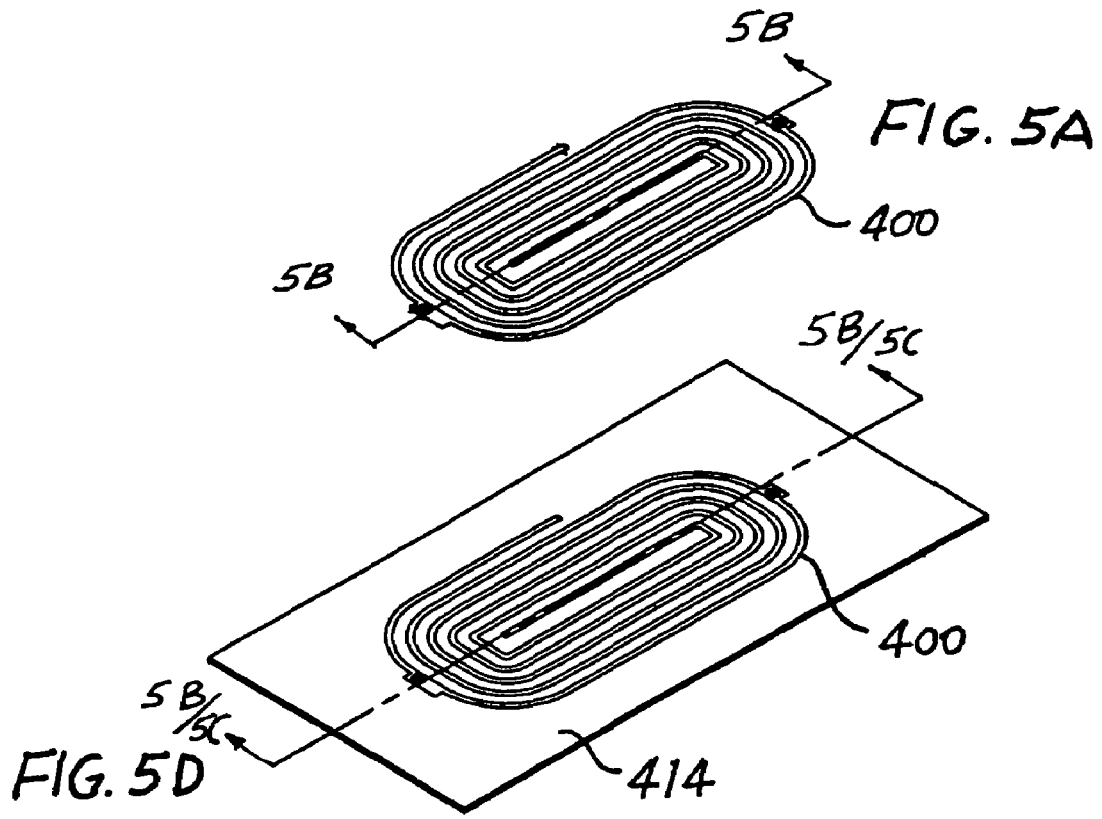
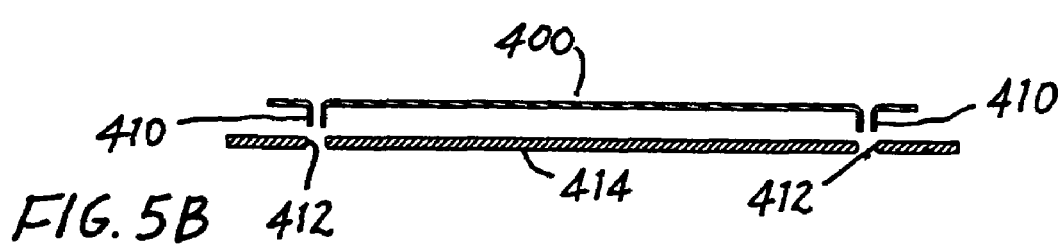
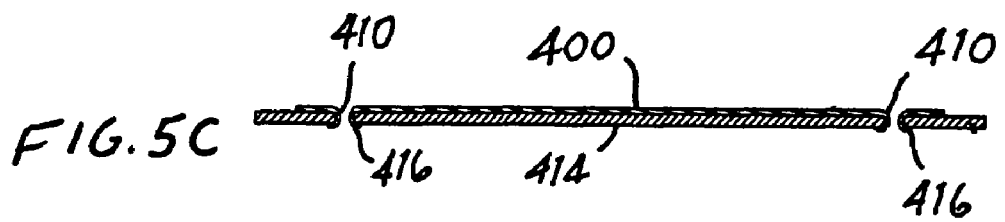

MANUFACTURE OF RFID TAGS AND INTERMEDIATE PRODUCTS THEREFOR

This application claims the benefit of provisional application Ser. No. 60/552,644, filed Mar. 12, 2004.

The present invention relates generally to radio frequency identification (RFID) tags, or cards, and pertains, more specifically, to the manufacture of RFID tags and intermediate products employed in manufacturing processes for such tags.

RFID tags are finding increased and widespread use as more systems are developed and placed into service for managing the inventory and sale of a wider variety of goods. These RFID tags are applied to the goods and employ electronic circuitry responsive to radio frequency (RF) signals for providing readily monitored identification data pertaining to the goods. By virtue of the manner in which RFID tags are attached to and carried by various articles, the tags must be made compact, usually are thin and flexible, and should be inexpensive enough to be readily expendable.

The circuitry of an RFID tag includes an antenna connected to other circuit components of the tag. The antenna typically occupies a substantial portion of the area dimensions of the tag and usually is constructed of a relatively thin copper foil for flexibility and for maximum effectiveness in responding to RF signals. Current manufacturing processes are similar to those employed in the manufacture of printed circuit boards. A thin copper foil, typically 0.0005 to 0.0015 inch in thickness, is laminated to a flexible synthetic polymeric substrate, such as a PET (polyethylene terephthalate) substrate having a thickness of about two to five mils. The desired antenna configuration then is photochemically etched from the laminate, that is, copper is chemically milled away leaving the desired copper pattern laminated to the chemically inert substrate. The substantial cost of the copper/PET laminate coupled with the relatively high cost of processing the substrate by chemical etching results in a total cost which becomes excessive when viewed in the light of the increasing demand for inexpensive, readily expendable RFID tags.

The present invention provides improvements in manufacturing processes and in intermediate products which facilitate the manufacture of highly effective, yet relatively inexpensive RFID tags for widespread use in connection with the management of inventories and sales of a wide variety of goods.

In summary, rather than chemically etching a desired antenna configuration from a copper foil laminated to a synthetic polymeric substrate, the antenna configuration is stamped from a thin sheet of copper or aluminum and subsequently is affixed to a substrate to establish an intermediate product used to complete an RFID tag. The ability to employ an antenna stamped from a thin metallic sheet enables the elimination of a relatively expensive laminated substrate starting material as well as the conventional costly manufacturing protocols associated with a chemical etching procedure. In addition, the stamping process, by allowing scrap material to be salvaged, conserves material and enables a concomitant reduction in expense.

Accordingly, the present invention attains several objects and advantages, some of which are summarized as follows: Facilitates the manufacture of RFID tags, enabling economical manufacture for widespread adoption and use; eliminates heretofore employed relatively expensive materials and processes in the manufacture of RFID tags; conserves material, with a concomitant reduction in expense; produces reliable RFID tags of consistent high quality and exemplary performance; allows increased flexibility of design and construction for adapting RFID tags to a wide variety of uses.

The above objects and advantages, as well as further objects and advantages, are attained by the present invention which may be described briefly as providing, in a method for manufacturing radio frequency identification tags having an electronic component connected electrically to an antenna, an improvement comprising the steps of: stamping an antenna from a thin metallic sheet; affixing the stamped antenna to a substrate at a first location to establish an intermediate product comprising the antenna affixed to the substrate; and placing the intermediate product at at least one subsequent location for further processing toward completion of a radio frequency identification tag.

The present invention further provides an intermediate product for the manufacture of radio frequency identification tags having an electronic component connected electrically to an antenna, the intermediate product comprising: an antenna stamped from a thin metallic sheet; and a substrate; the stamped antenna being affixed to the substrate for being placed at a prescribed location for further processing toward completion of a radio frequency identification tag.

The present invention will be understood more fully, while still further objects and advantages will become apparent, in the following detailed description of preferred embodiments of the invention illustrated in the accompanying drawing, in which:

FIGS. 3A through 3D are somewhat diagrammatic illustrations of a method and an intermediate product of the present invention;

FIGS. 5A through 5D are somewhat diagrammatic illustrations of still another method and intermediate product of the present invention;

Figure 1:
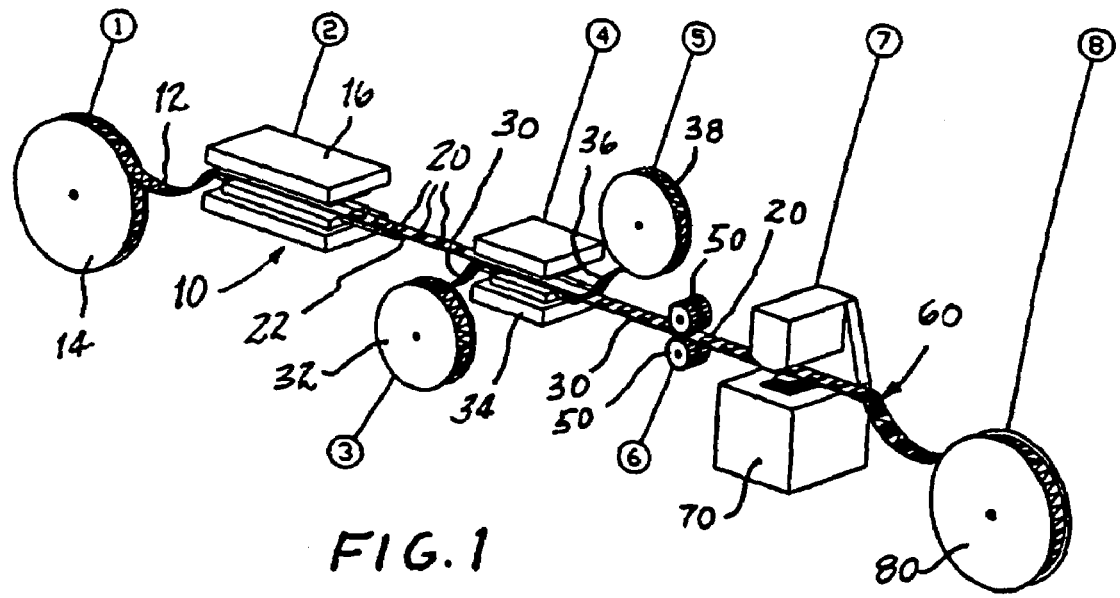
FIG. 1 is a diagrammatic illustration of a manufacturing operation conducted in accordance with the present invention.

Referring now to the drawing, in the embodiment of the invention illustrated diagrammatically in FIG. 1, a manufacturing operation is carried out at a plurality of stations shown as stations 1 through 8 located along a continuous sequential line 10. At station 1, copper or aluminum sheet is provided in the form of a strip 12 of thin material having a thickness of about 0.002 to 0.004 inch, supplied from a supply reel 14 and fed to a precision high-speed press 16 having a feed and a progressive blanking tool for stamping individual antennae 20 at station 2, which antennae 20 are maintained within the strip 12 so that strip 12 now serves as a carrier 22 for the blanked antennae 20, in a well-known manner, to be transported by the carrier 22 down line 10, beyond station 2.

A substrate material, such as PET, PVC (polyvinyl chloride) or paper, is fed in a ribbon 30 from a reel 32 at station 3 to a second high speed press 34 located at station 4 where antennae 20 are removed, in sequence, from the carrier 22 and are affixed to the ribbon 30, utilizing one of several alternatives described hereinafter. The carrier 22 then becomes scrap 36 which is collected at station 5 on reel 38 for ready disposal. Alternately, scrap 36 may be salvaged and recycled, thereby conserving material and reducing expense.

One option for affixing antennae 20 to ribbon 30 is the use of an adhesive. Either a pressure-sensitive adhesive or a thermally-activated adhesive is preferred. Should such adhesive attachment be employed, a further station 6 having compression rollers 50 can be provided for completing the affixation of antennae 20 to ribbon 30. Where the adhesive is a pressure-sensitive adhesive, rollers 50 provide pressure for assuring affixation. Where the adhesive is a thermally-activated adhesive, rollers 50 are heated and provide heat for activating the adhesive, as well as pressure for assuring affixation.

Once the antennae 20 are affixed to ribbon 30, intermediate product 60 essentially is ready for assembly with the further components necessary to complete the manufacture of RFID tags. As another option, a marking or printing device 70 may be located at an additional station 7 to place indicia, such as a bar code, upon each segment of intermediate product 60 to identify each RFID tag to be completed with that segment.

Upon completion of intermediate product 60, the intermediate product 60 is passed to station 8 where the intermediate product 60 is coiled onto a take-up reel 80 for removal to another operation where the RFID tags are completed.

Figure 2:
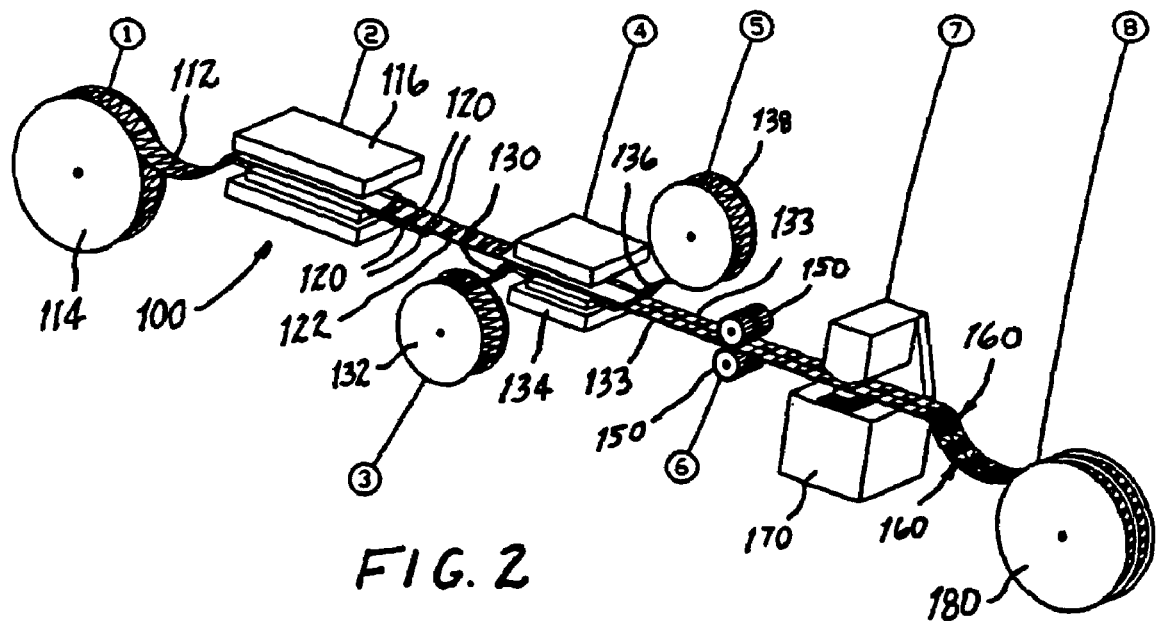
FIG. 2 is a diagrammatic illustration of a manufacturing operation conducted in accordance with another embodiment of the present invention.

In the embodiment illustrated diagrammatically in FIG. 2, a manufacturing operation shown at line 100 is very similar to that depicted at line 10 in FIG. 1, and is carried out at a plurality of stations shown as stations 1 through 8. At station 1, copper or aluminum sheet is provided in the form of a strip 112 of thin material having a thickness of about 0.002 to 0.004 inch, fed from a reel 114 to a precision high-speed press 116 having a feed and a progressive blanking tool for stamping individual antennae 120 at station 2, which antennae 120 are maintained within the strip 112 so that strip 12 now serves as a carrier 122 for the blanked antennae 120, in a well-known manner, to be transported by the carrier 122 along line 100, beyond station 2. In this instance, however, strip 112 is made wider than strip 12 and accommodates multiple antennae, illustrated in the form of two lines of antennae 120, placed laterally adjacent one another across the width of the strip 112.

A substrate material, such as PET, PVC or paper, is fed in a ribbon 130 from a reel 132 at station 3 to a second high speed press 134 located at station 4 where antennae 120 are removed from the carrier 122 and are affixed to the ribbon 130, in one of several alternatives described hereinafter. At the same time, the ribbon 130 is separated into independent substrates 133. The carrier 122 then becomes scrap 136 which is collected at station 5 on reel 138 for ready disposal or for recycling.

One option for affixing antennae 120 to ribbon 130 is the use of an adhesive. Either a pressure-sensitive adhesive or a thermally-activated adhesive is preferred. Should such adhesive attachment be employed, a further station 6 having compression rollers 150 can be provided for completing the affixation of antennae 120 to ribbon 130. Where the adhesive is a pressure-sensitive adhesive, rollers 150 provide pressure for assuring affixation. Where the adhesive is a thermally-activated adhesive, rollers 150 are heated and provide heat for activating the adhesive and pressure for assuring affixation.

Once the antennae 120 are affixed to ribbon 130, and ribbon 130 is split into separate substrates 133, intermediate products 160 essentially are ready for assembly with the further components necessary to complete the manufacture of RFID tags. As another option, a marking or printing device 170 may be located at an additional station 7 to place indicia, such as a bar code, upon each segment of each intermediate product 160 to identify each RFID tag to be completed with that segment.

Upon completion of intermediate products 160, the intermediate products 160 are passed to station 8 where the intermediate products 160 are coiled onto a dual take-up reel 180 for removal to another operation where the RFID tags are completed. In this manner, a single production line serves to produce multiple, laterally arranged intermediate products 160.

While adhesive fixation of an antenna 20 or 120 to a corresponding substrate, as described above, is quite acceptable, further economies of manufacture are realized by avoiding the added cost, added thickness, added weight and added processing time often associated with the use of adhesives. The following describes several advantageous alternatives.

Referring to FIGS. 3A through 3D, the use of an adhesive to affix a stamped antenna to a substrate in the manufacturing processes described above in connection with FIGS. 1 and 2 is avoided by employing a mechanical connection for affixation. Thus, as shown in FIG. 3A, a stamped antenna 200 is provided with tabs 210 which are fitted into holes 212 within substrate 214, as illustrated in FIG. 3B. The tabs 210 then are crimped at 216, as seen in FIG. 3C, to complete the affixation of antenna 200 to substrate 214, as illustrated in FIG. 3D.

Figure 4A:
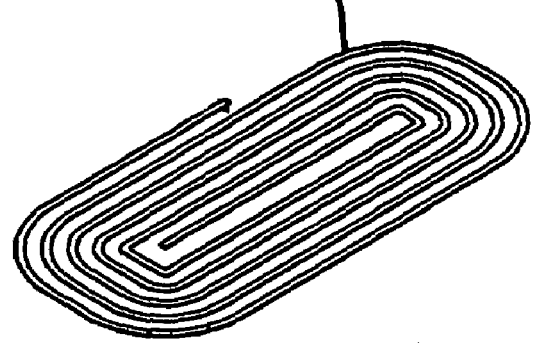
FIGS. 4A through 4C are somewhat diagrammatic illustrations of another method and intermediate product of the present invention.
Figure 4B:
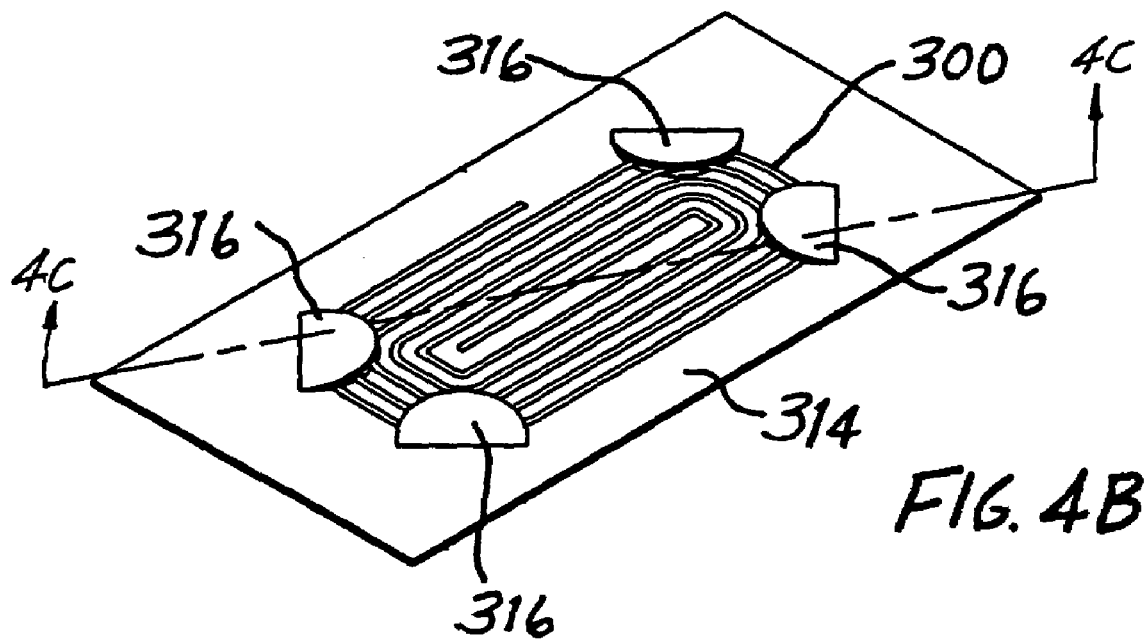
Figure 4C:
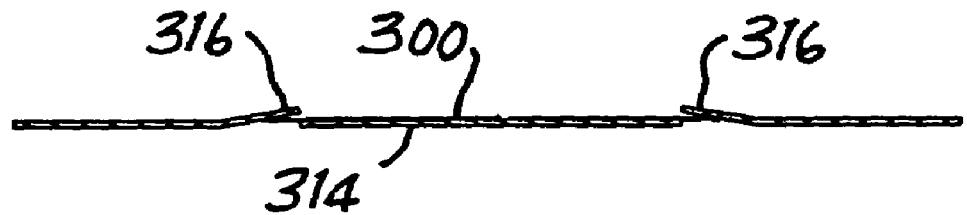

Turning to FIGS. 4A through 4C, a mechanical securement between a stamped antenna 300, shown in FIG. 4A, and a substrate 314, illustrated in FIGS. 4B and 4C, is attained by providing flaps 316 in substrate 314, as by die cutting the flaps 316 in substrate 314. Upon assembly of the antenna 300 with the substrate 314, flaps 316 are overlapped with corresponding portions of antenna 300 to secure antenna 300 affixed to substrate 314.

In the embodiment illustrated in FIGS. 5A through 5D, a stamped antenna 400, shown in FIG. 5A, is provided with posts 410 which are fitted into holes 412 within substrate 414, as illustrated in FIG. 5B. The posts 410 then are deformed at 416, as by crimping, as seen in FIG. 5C, to complete the affixation of antenna 400 to substrate 414, as illustrated in FIG. 5D. Posts 410 preferably are formed by extruding the material of antenna 400 into the hollow, tubular configuration shown, so that the posts 410 readily are deformed into securement, in a manner similar to the use of hollow rivets.

Figure 6A:
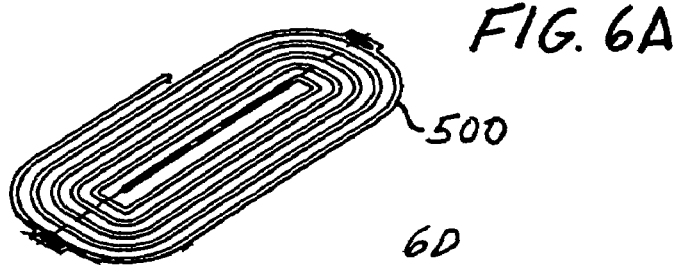
FIGS. 6A through 6D are somewhat diagrammatic illustrations of yet another method and intermediate product of the present invention.
Figure 6B:
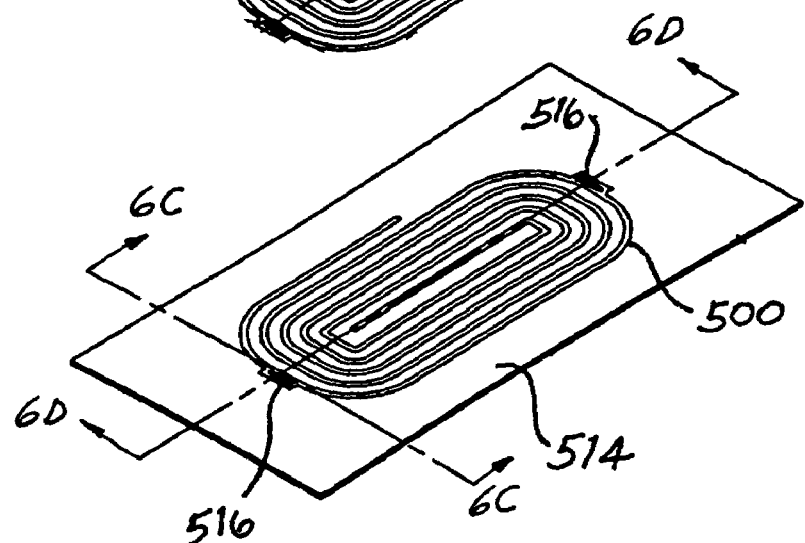
Figure 6C:
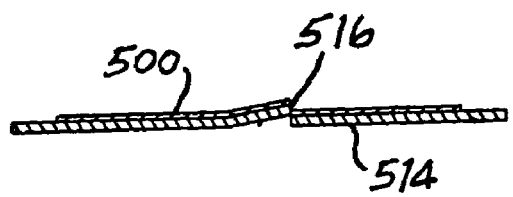
Figure 6D:
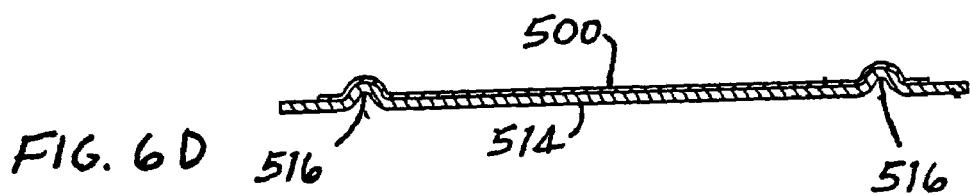

In the embodiment of FIGS. 6A through 6D, a stamped antenna 500, illustrated in FIG. 6A, is affixed relative to a substrate 514 by lanced connections 516, shown in FIGS. 6B, 6C and 6D.

The manufacture of an RFID tag requires that an electrical connection be made between the antenna and an RFID integrated circuit (IC) chip within the RFID tag. The employment of a stamped copper or aluminum antenna, as described above, enables the connection between the RFID IC chip and the antenna to be made readily by soldering. Solder connections are preferred in that corrosion is eliminated and the shortcomings of various mechanical connections are avoided. Mechanical connections can fail as a result of flexing of the RFID tag, and concomitant flexing of the antenna.

The stamped antenna enables the leads of an RFID IC chip to be soldered to the antenna, the preferred method utilizing a solder paste or a tinned strip applied to the antenna. A heat source, such as a laser or an induction heating arrangement, is used to apply the necessary heat for completing the soldered connection. Such a soldered connection not only provides the desired positive electrical connection, but enables economy of assembly in that the connection can be made prior to affixation of the antenna to the substrate.

Figure 7:
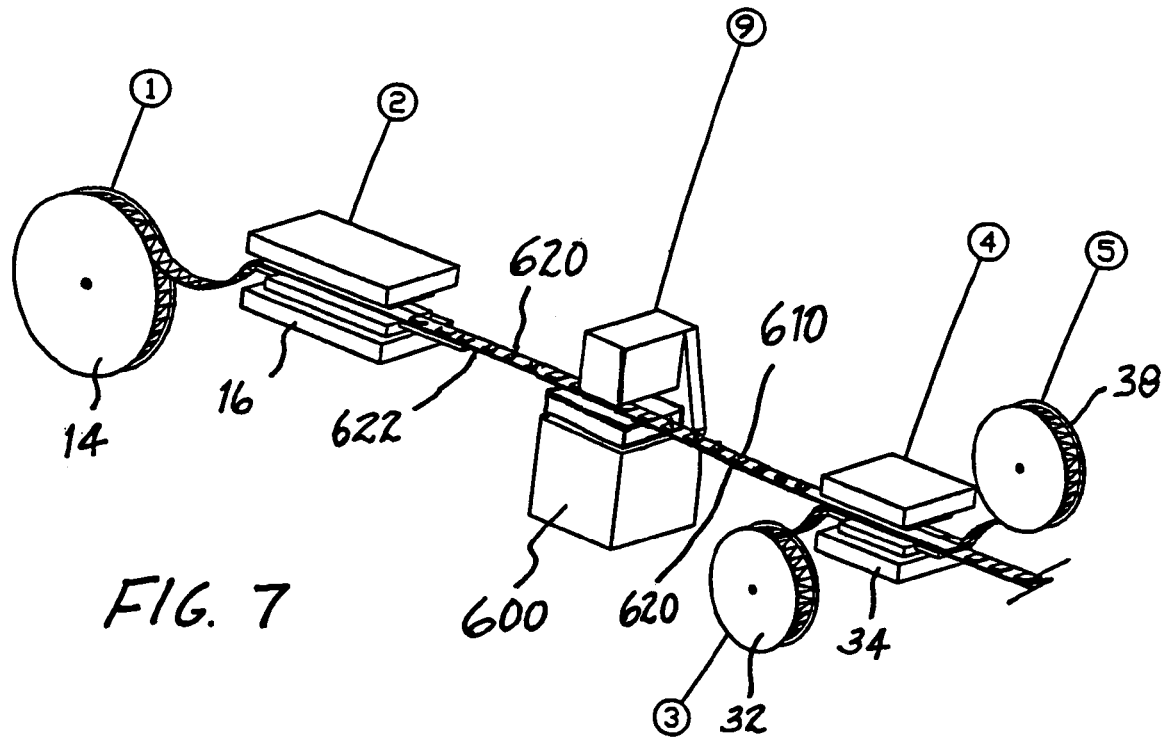
FIG. 7 is a diagrammatic illustration of still another manufacturing process conducted in accordance with the present invention.
Figure 8:
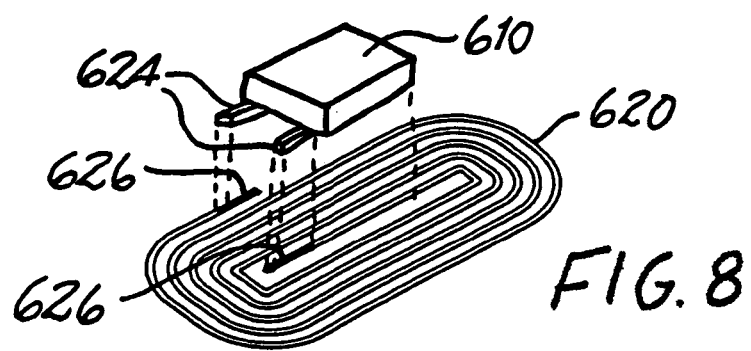
FIG. 8 is a somewhat diagrammatic illustration of another method and intermediate product of the present invention.

Thus, in the manufacturing process depicted in FIGS. 1 and 2 above, an RFID IC chip can be soldered to each antenna between stations 2 and 4, thereby enabling higher speed production of the RFID tag in a single, continuous sequential line. As illustrated in FIGS. 7 and 8, an additional station 9 is interposed between stations 2 and 4 and includes an apparatus 600 which places an RFID IC chip 610 in juxtaposition with each antenna 620 carried by strip 622, and solders the leads 624 of the chip 610 to tinned areas 626 on the antenna 620, all before affixation of the antenna to a substrate. The ability to make the electrical connection before affixation of the antenna to the substrate allows the use of the more desirable soldered connections without applying heat to the substrate, which otherwise could degrade or damage the substrate. Furthermore, having the ability to stamp the antenna and make the soldered connections within the same continuous, sequential line enables the incorporation of additional assembly procedures in that same line so as to realize further economy of manufacture. For example, the addition of the backing and the cover of a completed RFID tag can be accomplished within one continuous sequential line.

Figure 9:
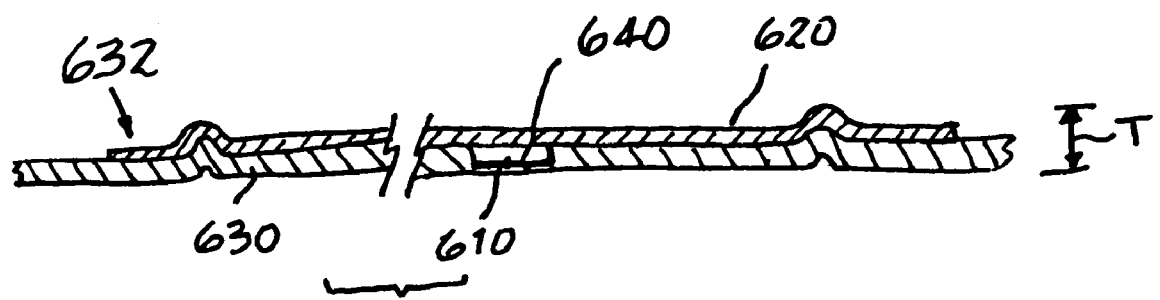
FIG. 9 is an enlarged diagrammatic illustration, somewhat similar to FIG. 6D, and showing another embodiment.

In FIG. 9, the antenna 620, with chip 610 electrically connected to antenna 620, is affixed to a substrate 630, utilizing one of the techniques described above, to construct intermediate product 632. In order to minimize and establish uniformity in the thickness T of intermediate product 632, substrate 630 is provided with a recess 640 complementary to chip 610 and located for registration with chip 610 so that upon affixation of the antenna 620, with chip 610, to substrate 630, chip 610 is received within recess 640. By thus receiving chip 610 within substrate 630, intermediate product 632 is provided with a relatively thin, essentially uniform thickness T, thereby enabling uniformity upon coiling intermediate product 632 upon a take-up reel, as described in connection with take-up reel 80 shown in FIG. 2, as well as providing a degree of protection against damage to chip 610.

Figure 10:
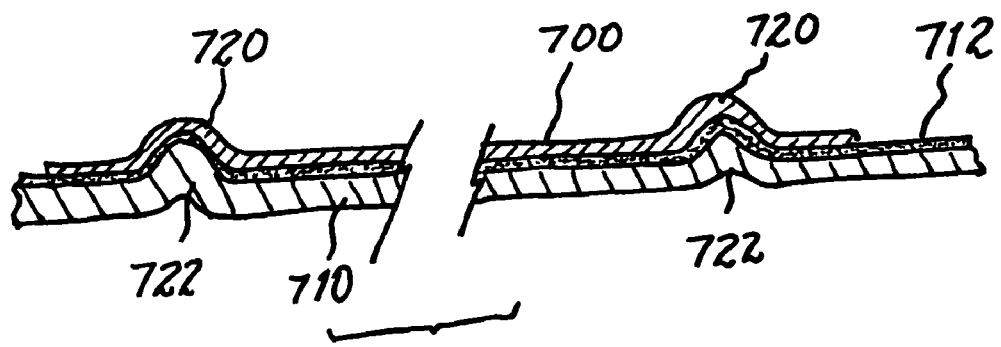
FIG. 10 is a somewhat diagrammatic illustration, similar to FIG. 9, and showing still another embodiment.

Turning to FIG. 10, a stamped antenna 700 is shown affixed to a substrate 710 with an adhesive layer 712. Prior to affixation of the antenna 700 to substrate 710, interengagable complementary elements 720 and 722 are formed in the antenna 700 and in the substrate 710, respectively, as by lancing, so as to enable accurate location and registration of antenna 700 and substrate 710 relative to one another for affixation by the adhesive in adhesive layer 712.

It will be seen that the present invention attains the several objects and advantages summarized above, namely: Facilitates the manufacture of RFID tags, enabling economical manufacture for widespread adoption and use; eliminates heretofore employed relatively expensive materials and processes in the manufacture of RFID tags; conserves material, with a concomitant reduction in expense; produces reliable RFID tags of consistent high quality and exemplary performance; allows increased flexibility of design and construction for adapting RFID tags to a wide variety of uses.

It is to be understood that the above detailed description of preferred embodiments of the present invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. In a method for manufacturing radio frequency identification tags having an electronic component connected electrically to an antenna, an improvement comprising the steps of:
   stamping an antenna from a thin metallic sheet;
   providing the antenna and a substrate with interengagable complementary elements for engagement to locate the antenna and the substrate relative to one another, and engaging the complementary elements to locate the antenna and the substrate relative to one another;
   affixing the stamped antenna to a substrate at a first location by adhering the antenna to the substrate with a thermally-activated adhesive and applying heat to activate the adhesive to establish an intermediate product comprising the antenna affixed to the substrate; and
   placing the intermediate product at at least one subsequent location for further processing toward completion of a radio frequency identification tag.

2. The improvement of claim 1 wherein the complementary elements are provided by lancing.

3. In a method for manufacturing radio frequency identification tags having an electronic component connected electrically to an antenna, an improvement comprising the steps of:
   stamping an antenna from a thin metallic sheet;
   affixing the stamped antenna to a substrate at a first location by connecting the antenna to the substrate with a mechanical connection which includes providing the antenna and the substrate with interengagable complementary elements for engagement to locate the antenna and the substrate relative to one another, and enqaging the complementary elements to affix the antenna to the substrate to establish an intermediate product comprising the antenna affixed to the substrate; and
   placing the intermediate product at at least one subsequent location for further processing toward completion of a radio frequency identification tag.

4. The improvement of claim 3 including lancing the antenna and the substrate to establish the complementary elements.

5. The improvement of claim 3 wherein the complementary elements include tabs on the antenna and holes in the substrate, and the mechanical connection includes inserting the tabs into corresponding holes and subsequently crimping the tabs to secure the antenna in place on the substrate.

6. The improvement of claim 3 wherein the complementary elements include posts on the antenna and holes in the substrate, and the mechanical connection includes inserting the posts into corresponding holes and subsequently deforming the posts to secure the antenna in place on the substrate.

7. The improvement of claim 3 wherein the complementary elements include flaps in the substrate, and the mechanical connection includes overlapping the flaps with the antenna to secure the antenna in place on the substrate.

8. An intermediate product for the manufacture of radio frequency identification tags having an electronic component connected electrically to an antenna, the intermediate product comprising:
   an antenna stamped from a thin metallic sheet; and
   a substrate;
   the antenna and the substrate including interengagable complementary elements for engagement to locate the antenna and the substrate relative to one another;
   the stamped antenna being affixed to the substrate with a thermally-activated adhesive for being placed at a prescribed location for further processing toward completion of a radio frequency identification tag.

9. The intermediate product of claim 8 wherein the complementary elements comprise lanced elements.

10. An intermediate product for the manufacture of radio frequency identification tags having an electronic component connected electrically to an antenna, the intermediate product comprising:
   an antenna stamped from a thin metallic sheet; and
   a substrate;
   the antenna being affixed to the substrate with a mechanical connection including interengagable complementary elements carried by the antenna and the substrate for engagement to locate the antenna and the substrate relative to one another.

11. The intermediate product of claim 10 wherein the complementary elements comprise lanced elements.

12. The intermediate product of claim 10 wherein the complementary elements include tabs on the antenna and holes in the substrate, and the mechanical connection includes the tabs inserted into corresponding holes and crimped to secure the antenna in place on the substrate.

13. The intermediate product of claim 10 wherein the complementary elements include posts on the antenna and holes in the substrate, and the mechanical connection includes the posts inserted into corresponding holes and deformed to secure the antenna in place on the substrate.

14. The intermediate product of claim 10 wherein the complementary elements include flaps in the substrate, and the mechanical connection includes the flaps overlapped with the antenna to secure the antenna in place on the substrate.

15. In a method for manufacturing electronic devices having an electronic component connected electrically to an antenna, an improvement comprising the steps of:
   stamping an antenna from a thin metallic sheet;
   providing the antenna and the substrate with interengagable complementary elements for engagement to locate the antenna and the substrate relative to one another, and engaging the complementary elements to locate the antenna and the substrate relative to one another;
   affixing the stamped antenna to a substrate at a first location by adhering the antenna to the substrate with a thermally-activated adhesive and applying heat to activate the adhesive to establish an intermediate product comprising the antenna affixed to the substrate; and
   placing the intermediate product at at least one subsequent location for further processing toward completion of an electronic device.

16. The improvement of claim 15 wherein the complementary elements are provided by lancing.

17. In a method for manufacturing electronic devices having an electronic component connected electrically to an antenna, an improvement comprising the steps of:
   stamping an antenna from a thin metallic sheet;
   affixing the stamped antenna to a substrate at a first location by connecting the antenna to the substrate with a mechanical connection which includes providing the antenna and the substrate with interengagable complementary elements for engagement to locate the antenna and the substrate relative to one another, and engaging the complementary elements to affix the antenna to the substrate to establish an intermediate product comprising the antenna affixed to the substrate; and
   placing the intermediate product at at least one subsequent location for further processing toward completion of an electronic device.

18. The improvement of claim 17 including lancing the antenna and the substrate to establish the complementary elements.

19. The improvement of claim 17 wherein the complementary elements include tabs on the antenna and holes in the substrate, and the mechanical connection includes inserting the tabs into corresponding holes and subsequently crimping the tabs to secure the antenna in place on the substrate.

20. The improvement of claim 17 wherein the complementary elements include posts on the antenna and holes in the substrate, and the mechanical connection includes inserting the posts into corresponding holes and subsequently deforming the posts to secure the antenna in place on the substrate.

21. The improvement of claim 17 wherein the complementary elements include flaps in the substrate, and the mechanical connection includes overlapping the flaps with the antenna to secure the antenna in place on the substrate.

22. An intermediate product for the manufacture of radio frequency identification tags having an electronic component connected electrically to an antenna, the intermediate product comprising:
   an antenna stamped from a thin metallic sheet; and
   a substrate;
   the antenna and the substrate including interengagable complementary elements for engagement to locate the antenna and the substrate relative to one another;
   the stamped antenna being affixed to the substrate with a thermally-activated adhesive for being placed at a prescribed location for further processing toward completion of a radio frequency identification tag.

23. The intermediate product of claim 22 wherein the complementary elements comprise lanced elements.

24. An intermediate product for the manufacture of electronic devices having an electronic component connected electrically to an antenna, the intermediate product comprising:
   an antenna stamped from a thin metallic sheet; and
   a substrate;
   the antenna being affixed to the substrate with a mechanical connection including interengagable complementary elements carried by the antenna and the substrate for engagement to locate the antenna and the substrate relative to one another.

25. The intermediate product of claim 24 wherein the complementary elements comprise lanced elements.

26. The intermediate product of claim 24 wherein the complementary elements include tabs on the antenna and holes in the substrate, and the mechanical connection includes the tabs inserted into corresponding holes and crimped to secure the antenna in place on the substrate.

27. The intermediate product of claim 24 wherein the complementary elements include posts on the antenna and holes in the substrate, and the mechanical connection includes the posts inserted into corresponding holes and deformed to secure the antenna in place on the substrate.

28. The intermediate product of claim 24 wherein the complementary elements include flaps in the substrate, and the mechanical connection includes the flaps overlapped with the antenna to secure the antenna in place on the substrate.

* * * * *